United States Patent

Saggers

[15] 3,676,545
[45] July 11, 1972

[54] CERTAIN BENZIMIDAZOLE AS RODENTICIDES

[72] Inventor: David Thomas Saggers, Saffron Walden, England

[73] Assignee: Fisons Limited, Felixstowe, Suffolk, England

[22] Filed: Nov. 28, 1969

[21] Appl. No.: 880,938

[30] Foreign Application Priority Data

Dec. 3, 1968    Great Britain.....................57,431/68

[52] U.S. Cl..................................424/273, 424/17, 424/84
[51] Int. Cl. .........................................................A01n 9/22
[58] Field of Search....................424/17, 273, 84; 260/309.2

[56] References Cited

UNITED STATES PATENTS 3,531,495    9/1970    Burton et al............................424/273

*Primary Examiner*—Jerome D. Goldberg
*Assistant Examiner*—Vincent D. Turner
*Attorney*—Wenderoth, Lind & Ponack

[57] ABSTRACT

Benzimidazole compounds of the formula

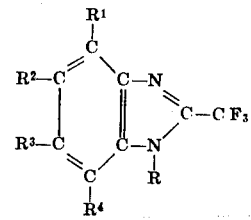

wherein R is alkyl of one to 12 carbon atoms and $R^1$, $R^2$, $R^3$ and $R^4$ are the same or different and are selected from the group consisting of hydrogen and halogen, not more than three of the groups $R^1$-$R^4$ being hydrogen are useful as rodenticides.

13 Claims, No Drawings

CERTAIN BENZIMIDAZOLE AS RODENTICIDES

The present invention relates to an improved process and composition for the destruction of rodents, particularly rats and mice and allied pests.

The serious depredations resulting from rat infestation are well known; quite apart from the actual consumption and spoilage of food in store and in the fields, rats represent a serious health hazard due to the diseases for which they are carriers. The destruction of rats is therefore a serious public health requirement, and any process for the destruction of rats, mice and other rodents results in improvement of storage facilities and farm areas, thus rendered free from rat infestation.

Many compounds exist which are toxic to rats and mice; the problem which has to be overcome is the provision of a toxic compound which will be consumed by the rodent. Thus rodenticides are normally formulated in a food bait; many toxic substances are repellant to rodents, so that in normal circumstances the rodent is disinclined to consume the poisoned bait. The toxic substance therefore in addition to being toxic to the rodent, also requires to be acceptable by smell and taste, or at least non-pepellant to the rodent, so that the poisoned bait is consumed by the rodent.

It has now been found that the substituted trifluoromethyl benzimidazoles hereinafter referred to, in addition to being highly toxic to rodents, particularly rats and mice, are also palatable to rodents.

Accordingly, the present invention is for a rodenticidal composition which contains an amount effectively toxic to rodents of a substituted benzimidazole of the formula:

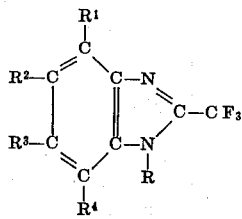

wherein R is hydrogen or an alkyl group (for example of 1–12 carbon atoms such as methyl, ethyl, propyl, butyl, decyl or dodecyl), and wherein $R^1$, $R^2$, $R^3$ and $R^4$ are the same or different and are selected from hydrogen, halogen (for example chloro, bromo, fluoro or iodo) and pseudo halogen (for example cyano), not more than three of the groups $R^1$–$R^4$ being hydrogen, or salts or functional derivatives thereof, in a solid or liquid carrier consumable by the rodent. Desirably not more than one of the groups $R^1$–$R^4$ is hydrogen. According to a preferred embodiment of the invention R is an alkyl group of one to three carbon atoms.

Compounds where R is hydrogen form salts such as metal and amine salts. These may be used in form of water soluble salts such as the alkali metal salts, but it is usually preferred to use an insoluble salt, such as the barium or calcium salt.

The present invention is also for a process of freeing buildings or areas from rodents, particularly rats and mice, which comprises introducing into the buildings or areas a rodenticidal composition as identified above.

The activity of the substituted benzimidazoles increases with decrease in particle size. Thus according to a preferred embodiment of the invention the substituted benzimidazole is micronized, for example, with sugar, china clay, or talc, and the resulting micronized powder used in the rodenticidal compositions. According to one embodiment of the invention the substituted benzimidazole is of a particle size of about 1 to 20 microns and preferably about 5 to 10 microns. It is usually necessary to grind or micronize the substituted benzimidazole in admixture with a solid diluent (for example comprising 10–20 percent by weight of the substituted benzimidazole). Since the heat of grinding may cause fusion of the substituted benzimidazole where this is micronized alone.

The rodenticidal composition is suitably in the form of a palatable composition containing the substituted benzimidazole. The rodenticidal composition suitably contains 0.025 to 5 percent, and preferably 0.1 to 2 percent, by weight of the substituted benzimidazole.

The rodenticidal composition suitably contains a "bait" for the rodent in the form of a solid substance edible by the rodent; such substances include oatmeal, cereals, cereal products, sugar, molasses, oil cake, lucerne flour, dried fungi, vegetables, vegetable products, bran, biscuits and the like. In addition the composition may also contain inert carriers such as talc, chalk and the like. In such cases the composition is suitably formulated as pellets or granules, which can be scattered in buildings or other rat infested areas.

The rodent will normally make several "feeds" of the rodenticidal composition, and the effect of the substituted benzimidazole poison is cummulative. By reason of the low concentration of the substituted benzimidazole in such compositions, these are not dangerous to children or domestic animals.

Although it is preferred to use the substituted benzimidazole in the form of solid palatable composition, this may also be presented in a liquid composition, for example in a syrup, or may be introduced into the drinking water used by the rats; such liquid compositions may, if desired, include a wetting agent.

Other types of composition include "tracking powders," comprising a finely divided powder for example talc, containing the substituted benzimidazole. The tracking powder is dusted on the floor over which the rodents walk, and the rodents consume the composition when they clean themselves. Such compositions suitably contain 0.1 to 5 percent by weight of the substituted benzimidazole. These compositions may also contain a surface active agent so as to prevent agglomeration of the powder, and may also contain dyestuffs, to make the dust less conspicuous on floors.

The substituted benzimidazole of the formula indicated above where R is hydrogen are the most toxic to rodents; however, the compounds where R is alkyl, although less toxic are more palatable, so that the rodents quickly consume a toxic dose. Furthermore, the slow onset of toxic symptoms ensures that the rodents consume a toxic dose before side effects reduce their desire for food. Palatability is further improved by the use of insoluble salts, and/or by presenting the benzimidazole in capsule or micro-encapsulated form, for example in gelatin. Preferred compounds which may be mentioned include, 4, 5, 6, 7-tetrachloro-2-trifluoromethyl benzimidazole, 1-methyl-4,5,6,7-tetrachloro-2-trifluoromethyl benzimidazole, 1-normalpropyl-4,7-dibromo-5,6-dichloro-2-trifluoromethyl benzimidazole, 1-normalpropyl-6-bromo-4,5,7-trichloro-2-trifluoromethyl-benzimidazole, 1-normalpropyl-4,6-dibromo-5,7-dichloro-2-trifluoromethyl benzimidazole, 1-methyl-4-bromo-5,6,7-trichloro-2-trifluoromethyl benzimidazole and 1-methyl-5-cyano-4,6,7-trichloro-2-trifluoromethyl benzimidazole.

A specially preferred compound, particularly for a mice poison is 1-normalpropyl-4,5,6,7-tetrachloro-2-trifluoromethyl benzimidazole. Another specially preferred compound, particularly for a rat poison is 1-methyl-4-bromo-5,6,7-trichloro-2-trifluoromethyl benzimidazole.

If desired the rodenticide composition according to the present invention may contain in addition to the substituted benzimidazole another rodenticide such as rodenticide of the anticoagulant type for example warfarin or other types of rodenticides for example norbormide or alphachloralose.

The following examples are given to illustrate the present invention.

EXAMPLE 1

Oatmeal pellets were prepared containing 1 percent by weight of 4,5,6,7-tetrachloro-2-trifluoromethyl benzimidazole. These pellets were fed to rats in the absence of other food. Mortality over a period of hours is shown below:

Hours of exposure to bait      % rat mortality

| | |
|---|---|
| 1 | 0 |
| 24 | 30 |
| 48 | 50 |
| 78 | 100 |

EXAMPLE 2

Oatmeal pellets were prepared containing 2 percent by weight of the substituted benzimidazole indicated below. These pellets were made available to rats together with equal proportions of unadulterated food. Mortality of the rats over a period of hours is shown below:

| Compound | % Rat Mortality Hours of exposure to bait | | | | |
|---|---|---|---|---|---|
| | 1 | 24 | 48 | 72 | 96 |
| 1-methyl-4,5,6,7-tetrachloro-2-trifluoromethyl benzimidazole | 0 | 0 | 90 | 100 | 100 |
| 1-n-propyl-4,5,6,7-tetrachloro-2-trifluoromethyl benzimidazole | 0 | 20 | 100 | 100 | 100 |

EXAMPLE 3

Oatmeal pellets were prepared containing 0.5, 0.25, and 0.0125 percent by weight (shown in the column headed "% a.i." below) of 4-bromo-1-methyl-5,6,7-trichloro-2-trifluoromethyl benzimidazole. These pellets were made available to rats together with equal proportions of the unadulterated food continuously for 10 days. The rats were caged individually and each day the mortality of the rats was recorded and the treated and untreated food was weighed and replenished. Ten rats were used for each dosage rate. The results are summarized in the following table. The total treated food eaten (in grams) is given in column A below, and the total alternative food eaten (in grams) is given in column B below.

| Percent, a.i. | Cumulative percent rat mortality, days of feeding— | | | | | | | | | | A | B |
|---|---|---|---|---|---|---|---|---|---|---|---|---|
| | 1 | 2 | 3 | 4 | 5 | 6 | 7 | 8 | 9 | 10 | | |
| 0.5 | 10 | 80 | 100 | 100 | 100 | 100 | 100 | 100 | 100 | 100 | 65 | 81 |
| 0.25 | 0 | 20 | 60 | 90 | 90 | 90 | 90 | 90 | 90 | 100 | 86 | 105 |
| 0.125 | 0 | 0 | 0 | 40 | 60 | 100 | 100 | 100 | 100 | 100 | 111 | 123 |

EXAMPLE 4

Oatmeal pellets were prepared containing the benzimidazole compounds listed in the first column of the table below at rates in percent by weight indicated in the second column (headed as =% a.i."). The pellets were made available to mice together with equal amounts of untreated food continuously for 14 days. Each day the treated and untreated pellets were weighed and replenished and the mortality of the mice recorded. Sixteen mice were used for each dosage rate, caged in groups of four. The results are summarized in the following table.

Compound I = 1-$_n$propyl-4,5,6,7-tetrachloro-2-trifluoromethyl benzimidazole

Compound II = 1-$_n$propyl-4,7-dibromo-5,6-dichloro-2-trifluoro-methyl benzimidazole Compound III = 1-$_n$propyl-6-bromo-4,5,7-trichloro-2-trifluoro-methyl benzimidazole Compound IV = 1-$_n$propyl-4,6-dibromo-5,7-dichloro-2-trifluoro-methyl benzimidazole Compound V = 1-methyl-4-bromo-5,6,7-trichloro-2-trifluoro-methyl benzimidazole Column A = Total treated food eaten in gms Column B = Total alternative food eaten in gms

| Compound | Percent. a.i. | Cumulative percent mouse mortality, days of feeding | | | | | | | | | | A | B |
|---|---|---|---|---|---|---|---|---|---|---|---|---|---|
| | | 1 | 2 | 3 | 4 | 5 | 6 | 7 | 8 | 9 | 10 | 11 | | |
| I | 0.25 | 0 | 0 | 75 | 87 | 94 | 100 | 100 | 100 | 100 | 100 | 100 | 83 | 80 |
| | 0.125 | 0 | 0 | 12 | 50 | 81 | 94 | 94 | 94 | 94 | 94 | 100 | 111 | 127 |
| | 0.062 | 0 | 0 | 0 | 0 | 12 | 12 | 56 | 81 | 81 | 81 | 87 | 198 | 231 |
| II | 0.125 | 0 | 0 | 50 | 81 | 87 | 87 | 87 | 100 | 100 | 100 | 100 | 102 | 112 |
| | 0.062 | 0 | 12 | 12 | 31 | 31 | 38 | 38 | 38 | 38 | 38 | 50 | 124 | 156 |
| III | 0.125 | 0 | 19 | 63 | 94 | 94 | 94 | 94 | 94 | 100 | 100 | 100 | 91 | 85 |
| | 0.062 | 0 | 12 | 44 | 81 | 87 | 94 | 94 | 94 | 94 | 94 | 94 | 149 | 74 |
| IV | 0.125 | 0 | 12 | 56 | 87 | 87 | 94 | 94 | 94 | 94 | 94 | 94 | 114 | 103 |
| | 0.062 | 0 | 0 | 25 | 50 | 75 | 75 | 75 | 75 | 75 | 75 | 75 | 170 | 91 |
| V | 0.125 | 19 | 69 | 75 | 81 | 81 | 94 | 100 | 100 | 100 | 100 | 100 | 34 | 148 |
| | 0.062 | 0 | 0 | 19 | 25 | 38 | 44 | 75 | 81 | 87 | 94 | 94 | 82 | 318 |

EXAMPLE 5

A tracking powder was prepared by micronizing 20 parts of 1-normalpropyl-4,5,6,7-tetrachloro-2-trifluoromethyl benzimidazole and 80 parts of talc to an average particle size of 5 microns, and diluting this with talc of average particle size 5 microns to give a powder containing 1 percent of the 1-normalpropyl-4,5,6,7-tetrachloro-2-trifluoromethyl benzimidazole.

This powder was dusted over runs frequented by mice; within 3 days all traces of mice had been cleared.

I claim:

1. A method of using a benzimidazole compound of the formula

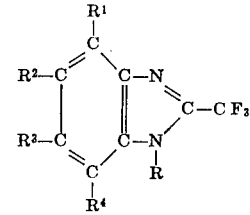

wherein R is alkyl of 1–12 carbon atoms and $R^1$, $R^2$, $R^3$, and $R^4$ are the same or different and are selected from the group consisting of hydrogen and halogen, not more than three of the groups $R^1$–$R^4$ being hydrogen, as a rodenticide which comprises applying said compound to a locus infested with rodents whereby said rodents consume a rodenticidally effective amount of said compound.

2. A method according to claim 1 wherein the compound is applied in the form of a rodenticidal composition comprising a rodenticidally effective amount of the compound and a compatible carrier therefor.

3. A method as in claim 2 wherein the composition is in the form of a solid substance edible by the rodents or in the form of a finely divided powder.

4. A method as in claim 2 wherein the composition contains an additional rodenticidally effective compound as an active ingredient.

5. A method as in claim 2 wherein the composition contains from 0.025 to 5 percent by weight of the benzimidazole compound.

6. A method according to claim 1 wherein the benzimidazole compound is present in a form selected from the group consisting of capsulated and micro-encapsulated forms.

7. A method as in claim 1 wherein the benzimidazole compound is one wherein R is alkyl of 1-3 carbon atoms.

8. A method as in claim 1 wherein the benzimidazole compound is one in which not more than one of the groups $R^1$–$R^4$ is hydrogen.

9. A method as in claim 1 wherein the benzimidazole compound is micronized.

10. A method as in claim 9 wherein the compound particle size is in the range of 1 to 20 microns.

11. A method as in claim 10 wherein the compound particle size is in the range of 5 to 10 microns.

12. A method according to claim 7 wherein the benzimidazole compound is 1-methyl-4-bromo-5,6,7-trichloro-2-trifluoromethyl benzimidazole.

13. A method according to claim 7 wherein the benzimidazole compound is 1-normal-propyl-4,5,6,7-tetrachloro-2-tri-fluoromethyl benzimidazole.

* * * * *